(12) United States Patent
Chen et al.

(10) Patent No.: US 11,803,095 B2
(45) Date of Patent: Oct. 31, 2023

(54) METHOD FOR IMPLEMENTING FOLDING M×N WAVELENGTH SELECTIVE SWITCH

(71) Applicant: Minzu University of China, Beijing (CN)

(72) Inventors: Genxiang Chen, Beijing (CN); Yunshu Gao, Beijing (CN); Nan Wang, Beijing (CN); Bing Yu, Beijing (CN); Qian Cui, Beijing (CN); Shengjuan Peng, Beijing (CN)

(73) Assignee: MINZU UNIVERSITY OF CHINA, Beijing (CN)

( * ) Notice: Subject to any disclaimer, the term of this patent is extended or adjusted under 35 U.S.C. 154(b) by 0 days.

(21) Appl. No.: 17/902,500

(22) Filed: Sep. 2, 2022

(65) Prior Publication Data
US 2023/0185154 A1    Jun. 15, 2023

(30) Foreign Application Priority Data

Dec. 10, 2021 (CN) .......................... 202111506588.4

(51) Int. Cl.
*G02F 1/295* (2006.01)
*G02B 6/35* (2006.01)

(52) U.S. Cl.
CPC .......... *G02F 1/2955* (2013.01); *G02B 6/3556* (2013.01); *G02F 2203/05* (2013.01); *G02F 2203/12* (2013.01); *G02F 2203/30* (2013.01)

(58) Field of Classification Search
CPC ............... G02F 1/2955; G02F 2203/12; G02F 2203/30; G02F 2203/50; G02F 1/31; G02F 1/13; G02F 1/311; G02B 6/3556; G02B 6/2931; G02B 6/29311; G02B 6/3512; G02B 6/3548; G02B 6/356
See application file for complete search history.

(56) References Cited

U.S. PATENT DOCUMENTS

2022/0179282 A1*  6/2022  Chang .................. G09G 3/2025

* cited by examiner

*Primary Examiner* — John Bedtelyon
(74) *Attorney, Agent, or Firm* — Troutman Pepper Hamilton Sanders LLP (Rochester)

(57) ABSTRACT

A method for implementing folding M×N wavelength selective switch is provided. A one-dimensional single-mode fiber optic collimator array, a short-focus cylindrical mirror, a first long-focus cylindrical mirror, a retroreflector, a transmission phase diffraction grating, a second long-focus cylindrical mirror, a liquid crystal spatial light modulator, and a liquid crystal graphic loading control system are provided along beam transmission direction. The same set of optical elements is used for incident light and outgoing light by ingenious folding structure. The input port and output port of optical signal are consistent in spatial arrangement, thereby reducing space and improving port utilization. Based on composite liquid crystal chips, a working area of the liquid crystal spatial light modulator is doubled, and a quantity of accommodating ports is greatly increased. A quantity of M×N ports of the WSS can be increased greatly by the above structure and design.

5 Claims, 8 Drawing Sheets

METHOD FOR IMPLEMENTING FOLDING M×N WAVELENGTH SELECTIVE SWITCH

CROSS REFERENCE TO RELATED APPLICATION(S)

This patent application claims the benefit of, and priority to, Chinese Patent Application No. 202111506588.4, entitled METHOD FOR IMPLEMENTING FOLDING M×N WAVELENGTH SELECTIVE SWITCH, filed on Dec. 10, 2021, which is incorporated by reference herein in its entirety.

TECHNICAL FIELD

The present disclosure relates to the field of optical communication and optical signal processing, and in particular, to a method for implementing a folding M×N wavelength selective switch (WSS).

BACKGROUND

In recent years, with the rise of technologies such as 5G access networks, multimedia services, and artificial intelligence, there are increasing requirements on bandwidth of optical networks. A light-electric-light conversion technology used by each switching node in a conventional optical communication network is limited by an electronic migration rate. Consequently, in a process of high-speed communication, "electronic bottlenecks", such as bandwidth limitation, slow response speed, clock skew, and high power consumption, occur in the conventional optical communication network, which gradually fails to meet a huge increase in switching capacity in a future communication network. Therefore, a next-generation intelligent all-optical network based on wavelength switching is an inevitable trend of "optical advance and electricity retreat" in the development of in the future communication network. In the construction of the all-optical network, a WSS, as a core component of an all-optical switching node, can maximize bandwidth resources of an optical fiber, and is not limited by a response speed of an electrical component. In addition to greatly improving signal transmission throughput, the WSS can also be compatible with signals of different rates, protocols, modulation frequencies, and standards simultaneously, and ensure transmission quality. Research and development results in the past 10 years show that the WSS is currently an only all-optical signal processing and switching device with a powerful signal processing function. The WSS has become an indispensable and important basic device in all-optical and intelligent transformation of a global optical network at present and in the future. The WSS receives extensive attention from international research institutes and component and device suppliers.

An M×N WSS, as a core component in the optical switching node, usually has M optical signal input ports and N optical signal output ports, and can output any one or a group of wavelength signals among optical signals of one of the M input ports through any one or more ports of the N output ports. In recent years, major research institutes at home and abroad, such as Finisar, Lumentum, and Huawei, have incorporated the following into major research and development plans: a liquid crystal spatial light modulator is used to build the M×N WSS. However, there is no commercialized M×N WSS so far. There are key technical challenges in a technical solution of the M×N WSS, such as a size limitation of a liquid crystal chip, an insufficient quantity of ports caused by inter-independence of input/output ports, a complex optical path structure, and a large insertion loss. At present, there are no satisfactory technical solution and experimental result.

SUMMARY

In view of key technical challenges in a current technical solution of an M×N WSS, such as a size limitation of a liquid crystal chip, an insufficient quantity of ports caused by inter-independence of input/output ports, a complex optical path structure, and a large insertion loss, the present disclosure proposes a method for implementing a folding M×N WSS.

A method for implementing a folding M×N WSS in the present disclosure includes:

(1) constructing an optical path, where:

(a) a one-dimensional single-mode fiber optic collimator array, a short-focus cylindrical mirror, a first long-focus cylindrical mirror, a retroreflector, a transmission phase diffraction grating, a second long-focus cylindrical mirror, a liquid crystal spatial light modulator, and a liquid crystal graphic loading control system are provided successively along a beam transmission direction;

(b) the one-dimensional single-mode fiber optic collimator array includes M+N single-mode fiber optic collimators, all the single-mode fiber optic collimators are arranged into a one-dimensional array along an x-axis direction, the M single-mode fiber optic collimators are used as input ports, the N single-mode fiber optic collimators are used as output ports, and beam transmission directions of each input port and each output port are along a z-axis direction;

(c) generatrices of the short-focus cylindrical mirror and the first long-focus cylindrical mirror are located on an xz plane, a z-axis passes through the generatrices of the short-focus cylindrical mirror and the first long-focus cylindrical mirror respectively, and the short-focus cylindrical mirror and the first long-focus cylindrical mirror form a 4f optical system;

(d) a surface of the transmission phase diffraction grating is evenly divided along a center line thereof into a first transmission region and a second transmission region that are the same and symmetrical with each other, the center line of the transmission phase diffraction grating is along the x-axis direction, a center line of the first transmission region is centrally aligned with the generatrix of the first long-focus cylindrical mirror, and the center line of the first transmission region is along the x-axis direction;

(e) the center line of the surface of the transmission phase diffraction grating is centrally aligned with a generatrix of the second long-focus cylindrical mirror and a center line of a surface of the liquid crystal spatial light modulator;

(f) planes of liquid crystal chips of the liquid crystal spatial light modulator and the retroreflector are placed perpendicular to a yz plane, the retroreflector is placed in front of the second transmission region of the transmission phase diffraction grating, a center line of the retroreflector is along the x-axis direction, and the center line of the retroreflector is centrally aligned with a center line of the second transmission region; and (g) the liquid crystal chips of the liquid crystal spatial light modulator are divided into M+N regions, where the M regions that are respectively in a one-to-one correspondence with the M input ports are used as a first reflection region, the N regions that are respectively in a one-to-one correspondence with the N output ports are used as a second reflection region, both M and N are natural numbers greater than or equal to 2, and the liquid crystal spatial light modulator is connected to the liquid crystal graphic loading control system;

(2) inputting M inter-independent incident beams with consecutive wavelengths respectively to the M input ports in the one-dimensional single-mode fiber optic collimator array;

(3) outputting, by the M input ports, M Gaussian beams transmitted inter-independently in parallel to each other along the z-axis, where optical axes of the M Gaussian beams passes through the generatrix of the short-focus cylindrical mirror and the generatrix of the first long-focus cylindrical mirror, M outgoing beams are expanded and collimated along a y-axis direction into M parallel beams along the y-axis direction by adjusting focal lengths of the short-focus cylindrical mirror and the first long-focus cylindrical mirror, and the short-focus cylindrical mirror and the first long-focus cylindrical mirror increase sizes of the M beams in the y-axis direction, and do no adjust sizes of the M beams in the x-axis direction;

(4) reaching, by the M beams, the first transmission region of the transmission phase diffraction grating, the M beams shown as elliptical spots with the y-axis as a long axis in the first transmission region of the transmission phase diffraction grating; and performing, by the transmission phase diffraction grating, a first dispersion on incident beams, such that beams with different wavelengths have different diffraction angles when respective beams pass through the transmission phase diffraction grating, the beams with different wavelengths are spatially separated, and various beams with different wavelengths included in the M beams are dispersed to a side of the second long-focus cylindrical mirror at different angles along an xz plane of respective propagation directions;

(5) converting, by the second long-focus cylindrical mirror, the dispersed beams with different wavelengths in different diffraction angles into the beams transmitted with optical axes in parallel to each other; focusing a single-wavelength beam into the liquid crystal spatial light modulator; integrally deflecting these beams transmitted in parallel to each other towards a center line of the liquid crystal spatial light modulator; further compressing, by the second long-focus cylindrical mirror, an elliptical beam with a single wavelength in the beams and with the y-axis as a long axis before into an elliptical beam with the x-axis as a long axis; and projecting the M beams to the corresponding M regions in the first reflection region on the liquid crystal chips;

(6) transmitting the beams with different wavelengths in parallel to each other, and projecting the beams to respectively corresponding different pixel regions in the first reflection region of the liquid crystal spatial light modulator, where included angles between the beams with different wavelengths in M incident beams and the xz plane are transverse deflection angles $\theta$; loading, by the liquid crystal graphic loading control system, specific phase grayscale images in pixel regions corresponding to different wavelengths in the M regions of the first reflection region of the liquid crystal spatial light modulator, such that light reflected in a corresponding pixel region passes through the second long-focus cylindrical mirror and the transmission phase diffraction grating to the retroreflector to be reflected and then return to one of the N regions of the second reflection region, where the one of the N regions corresponds to one of the N output ports; and loading, by the liquid crystal graphic loading control system, different phase grayscale images to control the reflected light to form different included angles with the yz plane for implementing a first deflection of the incident beams, where included angles between all reflected light with different wavelengths and the xz plane remain equal to the transverse deflection angles $\theta$;

(7) converting, by the liquid crystal spatial light modulator, a divergence state of the incident beams along the x-axis on the xz plane into a converging state along the x-axis during the first deflection of the incident beams, to implement a first conversion of the beams, where a location of the retroreflector is a converging focal plane, and the beams continue to diverge along the x-axis after converging along the x-axis at the location of the retroreflector;

(8) returning, by the beams with different wavelengths in the M incident beams after the first deflection, to the other side of the second long-focus cylindrical mirror, which is symmetrical to the incident beams along the generatrix, where the transverse deflection angles $\theta$ between the reflected beams and the xz plane disappear after the reflected beams passes through the second long-focus cylindrical mirror; converging, by the second long-focus cylindrical mirror, light with different wavelengths in the same beam of the beams to the second transmission region of the transmission phase diffraction grating to implement a first inverse dispersion in the second transmission region of the transmission phase diffraction grating; and then reflecting, by the retroreflector, the light, where since the retroreflector is placed perpendicular to the yz plane, included angles between the beams reflected by the retroreflector and the yz plane are equal to deflection angles between the wavelength beams after the first deflection and the yz plane;

(9) passing, by the beams reflected by the retroreflector, through the second transmission region of the transmission phase diffraction grating again to implement a second dispersion; and projecting the beams after the second dispersion to the corresponding N regions in the second reflection region of the liquid crystal spatial light modulator after passing through the second long-focus cylindrical mirror, where in this case, the second long-focus cylindrical mirror enables the beams with different wavelengths to be transmitted in parallel to each other and to form the transverse deflection angles $\theta$ with the xz plane;

(10) loading, by the liquid crystal graphic loading control system, the specific phase grayscale images on the N regions of the second reflection region of the liquid crystal spatial light modulator to enable the reflected beams to form different included angles with the yz plane; when the beams after the second dispersion return to the second reflection region of the liquid crystal spatial light modulator, controlling the liquid crystal spatial light modulator to load the specific phase grayscale images on pixel regions corresponding to a corresponding wavelength to implement a second deflection of the beams, wherein the second deflection enables the different included angles between the different beams and the yz plane to disappear, and enables optical axes of beams with one or more wavelengths after the second deflection to be parallel to optical axes of beams with same wavelengths before the first deflection, and light with a wavelength corresponding to a non-parallel beam is discarded; and when wavelengths are the same, generating an offset in the x-axis direction between the beams after the second deflection and the beams before the first deflection, so that the N beams after the second deflection in the N regions of the second reflection region can return to corresponding output ports;

(11) converting, by the liquid crystal spatial light modulator, a divergence state of the incident beams along the x-axis on the xz plane into a converging state along the x-axis during the second deflection of the incident beams, to implement a second conversion of the beams, where a location of an output port of the one-dimensional single-mode fiber optic collimator array is a converging focal plane, the two beam conversions of the liquid crystal spatial light modulator are considered as the 4f optical system, and a plane in which the retroreflector is located is a 2f location of the 4f optical system; and

(12) transmitting, for a second inverse dispersion, the subsequently returned beams to the first transmission region of the transmission phase diffraction grating after passing through the second long-focus cylindrical mirror, and the beams after the second inverse dispersion returning to any one or more of specific ports corresponding to the N output ports after sequentially passing through the generatrices of the first long-focus cylindrical mirror and the short-focus cylindrical mirror, so that port switching of optical signal in the incident beams with any wavelength channel and any bandwidth is implemented by the two deflections and reflections of the incident beams by using the retroreflector and the liquid crystal spatial light modulator.

The liquid crystal spatial light modulator includes multiple liquid crystal chips, a quantity of liquid crystal chips is continually expanded based on a quantity of required ports, and a surface of each liquid crystal chip is a two-dimensional pixel array; and the liquid crystal graphic loading control system loads the specific phase grayscale images on the two-dimensional pixel array, to produce a diffraction effect on a beam incident on a corresponding pixel, such that an specific angle deflection of incident light is implemented by loading the specific phase grayscale images.

The short-focus cylindrical mirror is a cylindrical mirror with a focal length within 100 mm. The first long-focus cylindrical mirror and the second long-focus cylindrical mirror are cylindrical mirrors with focal lengths greater than 50 mm.

Further, N is an even number, N/2 output ports are located above the M input ports along the x-axis direction, other N/2 output ports are located below the M input ports, and the output ports are distributed symmetrically with each other with respect to the yz plane. Symmetrical distribution of the output ports implements symmetrical distribution of optical paths of incident optical signals from the M input ports to the N output ports, so that a deflecting function of the liquid crystal spatial light modulator in space for the beams can be properly and effectively utilized.

The present disclosure has the following advantages:

In the present disclosure, the same set of optical elements can be used for both the incident light and outgoing light by using an ingenious folding structure in the optical system. In this structure, an input port and an output port of an optical signal are consistent with each other in a spatial arrangement, thereby reducing space and further improving port utilization. Based on composite liquid crystal chips, a working area of the liquid crystal spatial light modulator is doubled, and a quantity of accommodating ports is greatly increased. Therefore, a quantity of M×N ports of the WSS can be increased greatly by using the above structure and design.

DETAILED DESCRIPTION

The present disclosure is further described below with reference to the specific examples and accompanying drawings.

Figure 1:
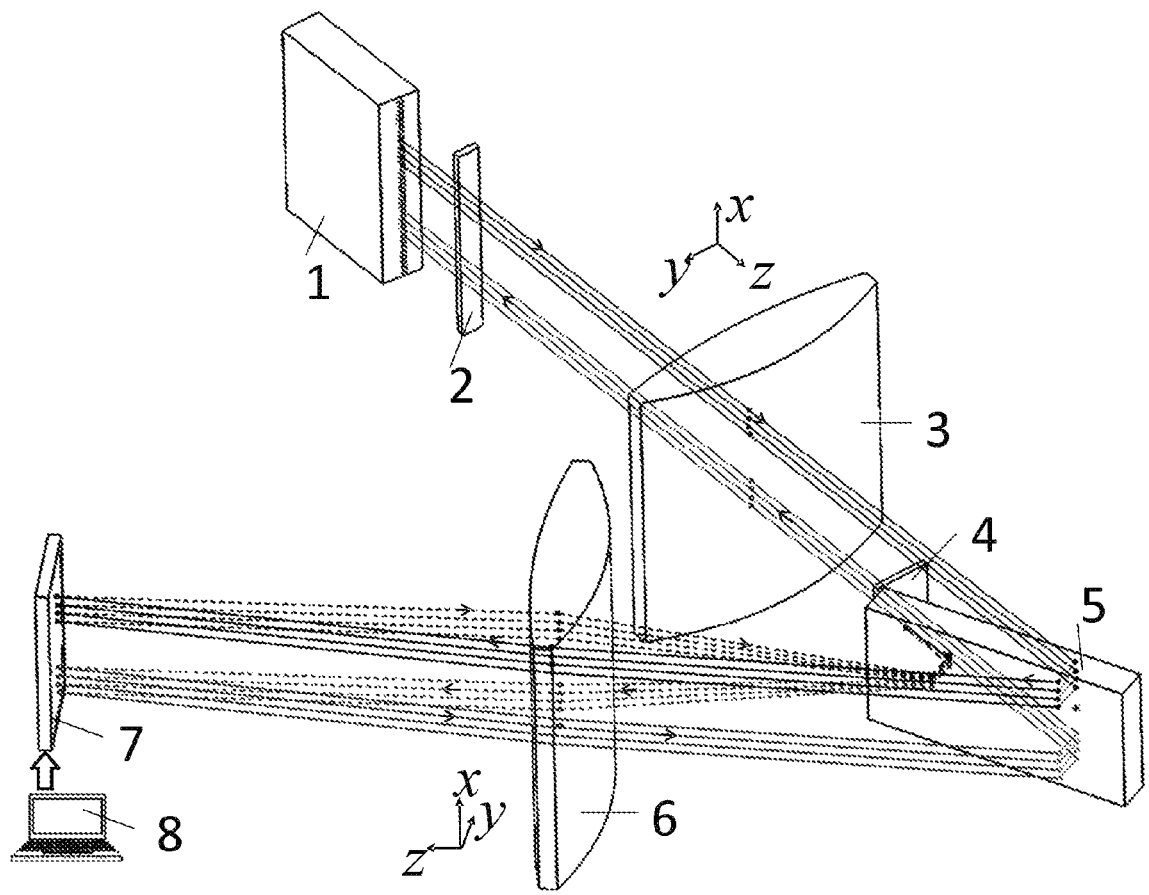
FIG. 1 is a schematic diagram of component placement and beam transmission in an example of a folding M×N WSS according to the present disclosure, to clearly represent optical signal transmission paths, a dispersion effect of the transmission phase diffraction grating is omitted in the figure, and only a port switching principle when multiple ports separately transmit one single-wavelength beam is drawn.
Figure 2:
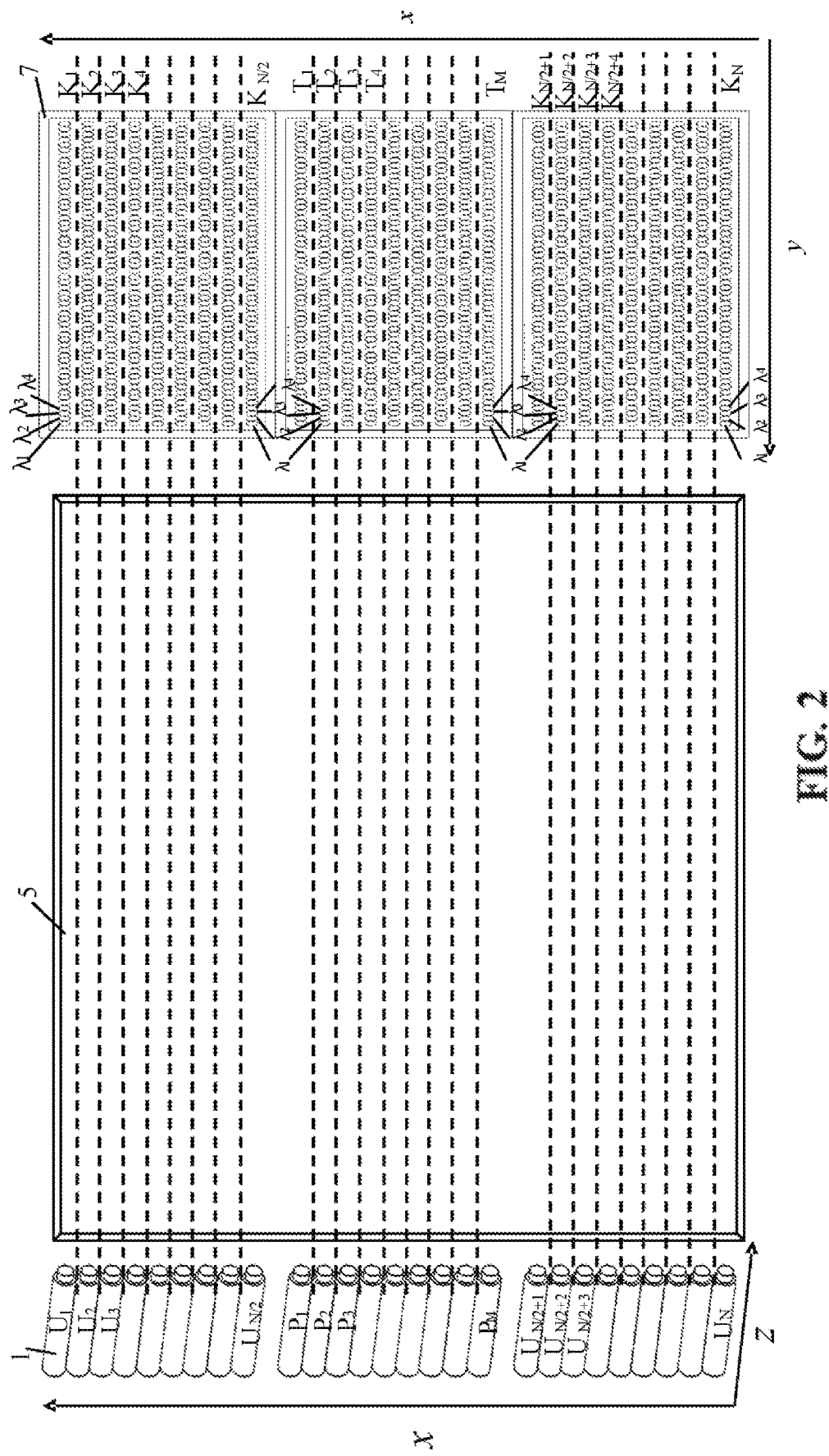
FIG. 2 is a diagram of different collimator port numbers of the one-dimensional single-mode fiber optic collimator array and corresponding transmission phase diffraction gratings, a partition situation on a liquid crystal spatial light modulator, and distribution regions of beams with different wavelengths on the liquid crystal spatial light modulator in an example of a folding M×N WSS according to the present disclosure.
Figure 3:
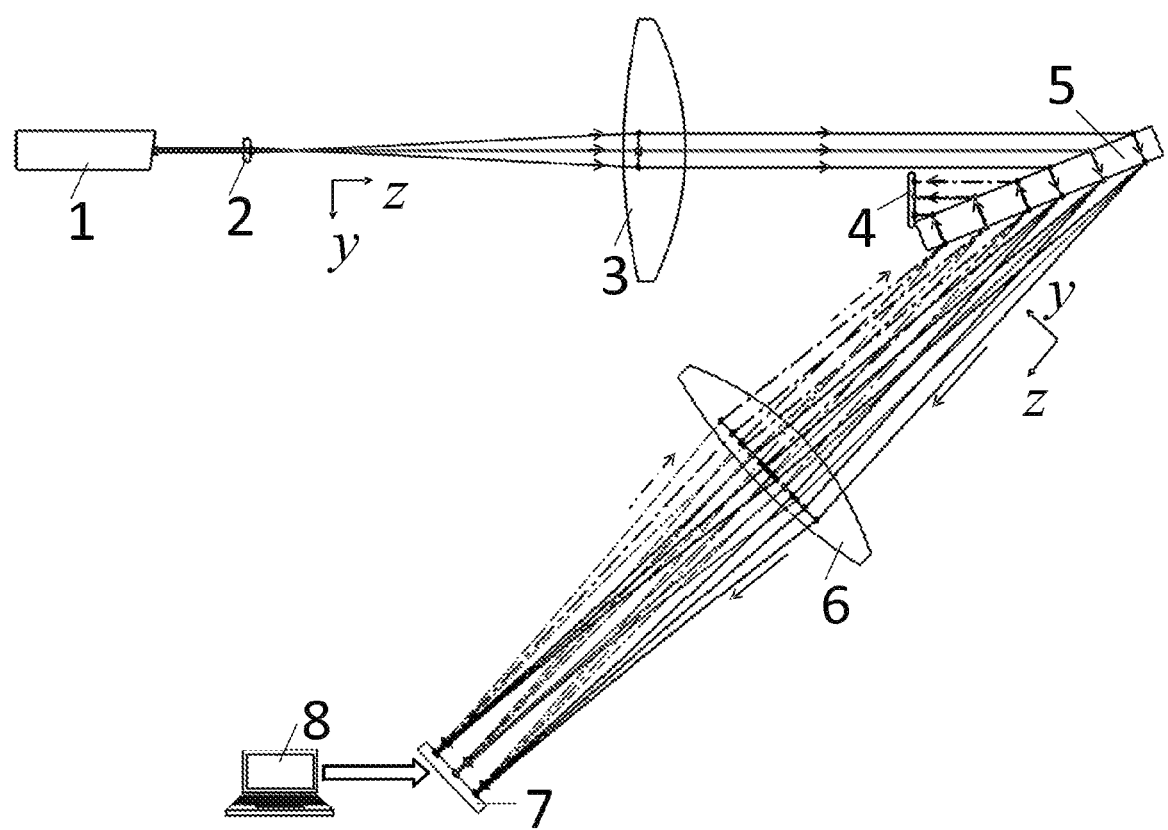
FIG. 3 is a schematic diagram of transmission of beams with different wavelengths on the yz plane in an example of a folding M×N WSS according to the present disclosure.

In an example, as shown in FIGS. 1-3, a folding M×N WSS includes a one-dimensional single-mode fiber optic collimator array 1, a short-focus cylindrical mirror 2, a first long-focus cylindrical mirror 3, a retroreflector 4, a transmission phase diffraction grating 5, a second long-focus cylindrical mirror 6, a liquid crystal spatial light modulator 7, and a liquid crystal graphic loading control system 8, which are provided successively along a beam transmission direction. The one-dimensional single-mode fiber optic collimator array 1 includes M+N single-mode fiber optic collimators, and all the single-mode fiber optic collimators are arranged into a one-dimensional array along an x-axis direction. The M single-mode fiber optic collimators are used as input ports and are respectively a first to an $M^{th}$ input ports $P_1$, $P_2$, ..., $P_M$. The N single-mode fiber optic collimators are used as output ports and are respectively a first to an $N^{th}$ output ports $U_1$, $U_2$ ..., $U_N$. The beam transmission directions of each input port and each output port are along a z-axis direction. Generatrices of the short-focus cylindrical mirror 2 and the first long-focus cylindrical mirror 3 are located on an xz plane. A z-axis passes through the generatrices of the short-focus cylindrical mirror 2 and the first long-focus cylindrical mirror 3. The short-focus cylindrical mirror 2 and the first long-focus cylindrical mirror 3 form a 4f optical system. A surface of the transmission phase diffraction grating 5 is evenly divided along a center line thereof into a first transmission region $S_1$ and a second transmission region $S_2$ that are the same and symmetrical with each other. The center line of the transmission phase diffraction grating 5 is along the x-axis direction. A center line of the first transmission region is centrally aligned with the generatrix of the first long-focus cylindrical mirror 3, and the center line of the first transmission region is along the x-axis direction. The center line of the surface of the transmission phase diffraction grating 5 is centrally aligned with a generatrix of the second long-focus cylindrical mirror 6 and a center line of a surface of the liquid crystal spatial light modulator 7. Planes of liquid crystal chips of the liquid crystal spatial light modulator 7 and the retroreflector 4 are placed perpendicular to a yz plane. The retroreflector 4 is placed in front of the second transmission region of the transmission phase diffraction grating 5. A center line of the retroreflector 4 is along the x-axis direction, and the center line of the retroreflector 4 is centrally aligned with a center line of the second transmission region. The liquid crystal chips of the liquid crystal spatial light modulator 7 are divided into M+N regions. The M regions that are respectively in a one-to-one correspondence with the M input ports are used as a first reflection region and marked as $T_1$, $T_2$ ..., and $T_M$, and the N regions that are respectively in a one-to-one correspondence with the N output ports are used as a second reflection region and marked as $K_1$, $K_2$ ..., and $K_N$, where M is 5 and N is 10 in this example. The first long-focus cylindrical mirror 3 and the second long-focus cylindrical mirror 6 are double-cemented cylindrical mirrors. The liquid crystal spatial light modulator 7 is connected to the liquid crystal graphic loading control system 8.

In this example, as shown in FIGS. 1-8, a method for implementing a folding M×N WSS includes the following steps:

(1) An optical path is constructed.

(2) An incident beam with consecutive wavelengths is input from the first input port $P_1$ in the M input ports in the one-dimensional single-mode fiber optic collimator array 1, where M=5.

(3) The first input port $P_1$ outputs a Gaussian beam transmitted along the z-axis. An optical axis of the Gaussian beam passes through the generatrix of the short-focus cylindrical mirror 2 and the generatrix of the first long-focus cylindrical mirror 3. By adjusting focal lengths of the short-focus cylindrical mirror 2 and the first long-focus cylindrical mirror 3, the incident beam is expanded and collimated along a y-axis direction into a parallel beam along the y-axis direction. The short-focus cylindrical mirror 2 and the first long-focus cylindrical mirror 3 increase a size of the incident beam in the y-axis direction, and do no adjust a size of the incident beam in the x-axis direction.

(4) The incident beam reaches the first transmission region $S_1$ of the transmission phase diffraction grating 5, and is shown as an elliptical spot with the y-axis as a long axis in the first transmission region $S_1$ of the transmission phase diffraction grating 5. The transmission phase diffraction grating 5 performs a first dispersion on the incident beam such that beams with different wavelengths have different diffraction angles when the beams pass through the transmission phase diffraction grating 5, the beams with different wavelengths are spatially separated, and the beams with different wavelengths are dispersed to one side of the second long-focus cylindrical mirror 6 at different angles along an xz plane of respective propagation directions.

(5) The second long-focus cylindrical mirror 6 converts the dispersed beams with different wavelengths in different diffraction angles into the beams transmitted with optical axes parallel to each other, and focuses a single-wavelength beam into the liquid crystal spatial light modulator 7. These beams transmitted in parallel to each other are integrally deflected towards a center line of the liquid crystal spatial light modulator 7. The second long-focus cylindrical mirror 6 further compresses that is, focuses, an elliptical beam with a single wavelength in the beams and with the y-axis as a long axis before into an elliptical beam with the x-axis as a long axis. The beams with different wavelengths are projected to corresponding different pixel regions in the first region $T_1$ of the first reflection region on the liquid crystal chips.

Figure 4:
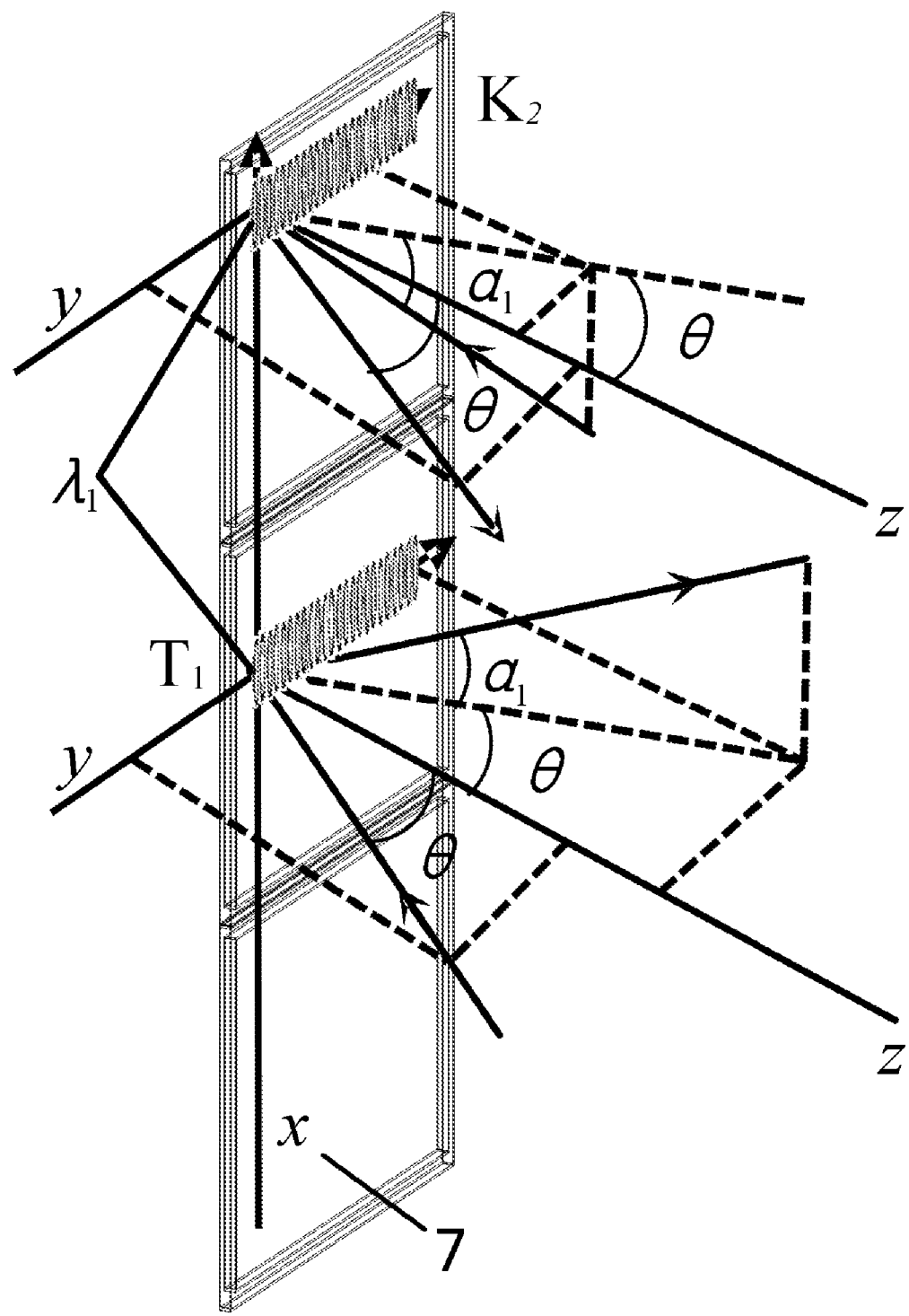
FIG. 4 is a schematic diagram of angle deflections for the first deflection and the second deflection performed by the liquid crystal spatial light modulator on beams in an example of a folding M×N WSS according to the present disclosure.
Figure 5:
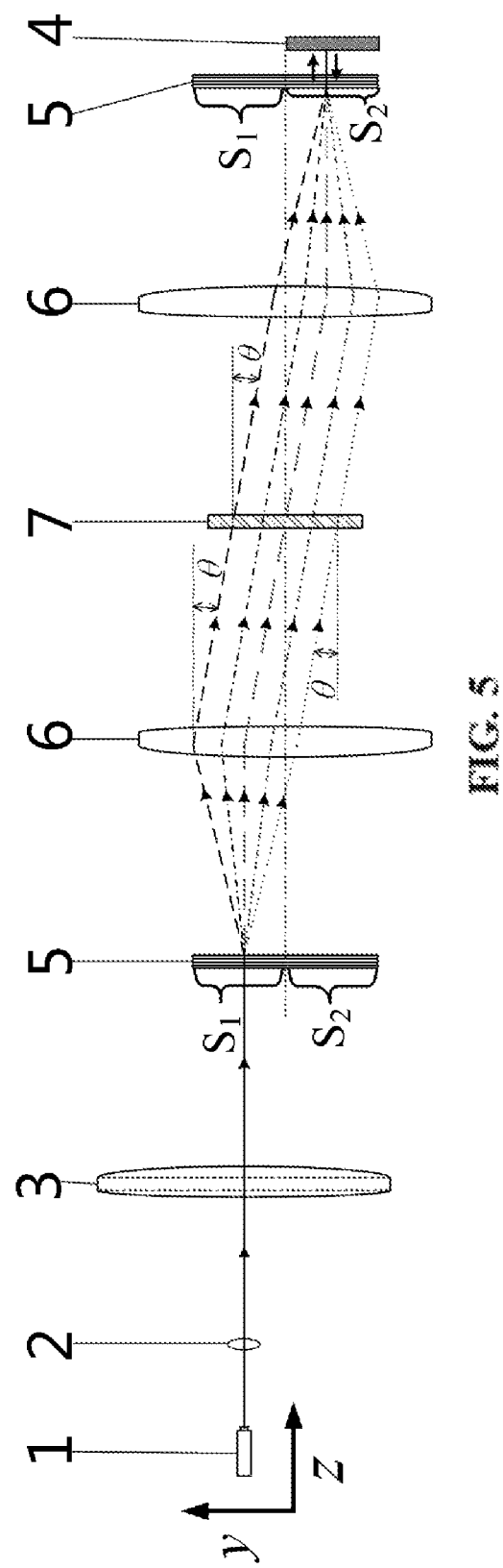
FIG. 5 is a schematic diagram of transmission of beams with different wavelengths on the yz plane in an example of a folding M×N WSS according to the present disclosure, to clearly represent an optical signal transmission path, only a transmission path of an optical axis of optical signals with different wavelengths is drawn, a reflective liquid crystal spatial light modulator is represented as a transmission type, and an incident angle and a diffraction angle of the transmission phase diffraction grating are omitted.
Figure 6:
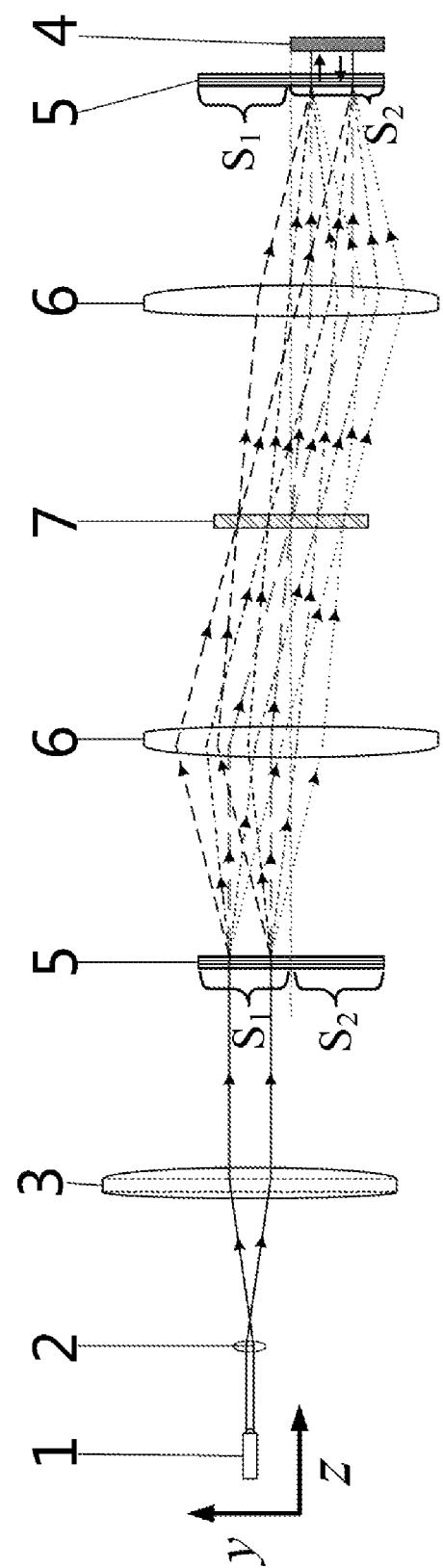
FIG. 6 is a schematic diagram of size conversion of beams with different wavelengths on the yz plane in an example of a folding M×N WSS according to the present disclosure, to clearly represent an optical signal transmission path, the reflective liquid crystal spatial light modulator is represented as the transmission type, the incident angle and diffraction angle of the transmission phase diffraction grating are omitted, and changes of widths corresponding to all the beams with different wavelengths are drawn.

(6) Beams with different wavelengths $\lambda_1, \lambda_2, \lambda_3, \lambda_4$ ... are transmitted in parallel to each other, and projected to respectively corresponding different pixel regions in the first region $T_1$ of the first reflection region of the liquid crystal spatial light modulator 7. As shown in FIG. 2, included angles between the beams with different wavelengths in the incident beam and the xz plane are transverse deflection angles θ. The liquid crystal graphic loading control system 8 loads specific phase grayscale images in pixel regions corresponding to different wavelengths in the first reflection region $T_1$ of the liquid crystal spatial light modulator 7. Therefore, light reflected in a corresponding pixel region passes through the second long-focus cylindrical mirror 6 and the transmission phase diffraction grating 5 to the retroreflector 4 to be reflected to one of the N regions of the second reflection region, where the one of the N regions corresponds to one of the N output ports. Different phase grayscale images are loaded to control the reflected light with first to fourth wavelengths $\lambda_1$, $\lambda_2$, $\lambda_3$, and $\lambda_4$ to form different included angles $\alpha_1$, $\alpha_2$, $\alpha_3$, and $\alpha_4$ with the yz plane for implementing a first deflection of the incident beam. As shown in FIG. 4, included angles between all reflected light with different wavelengths and the xz plane remain equal to the transverse deflection angles $\theta$.

(7) The liquid crystal spatial light modulator 7 converts a divergence state of the incident beam along the x-axis on the xz plane into a converging state along the x-axis during the first deflection of the incident beam, to implement a first conversion of the beam. A location of the retroreflector 4 is a converging focal plane, and the beam continue to diverge along the x-axis after converging along the x-axis at the location of the retroreflector 4.

Figure 7:
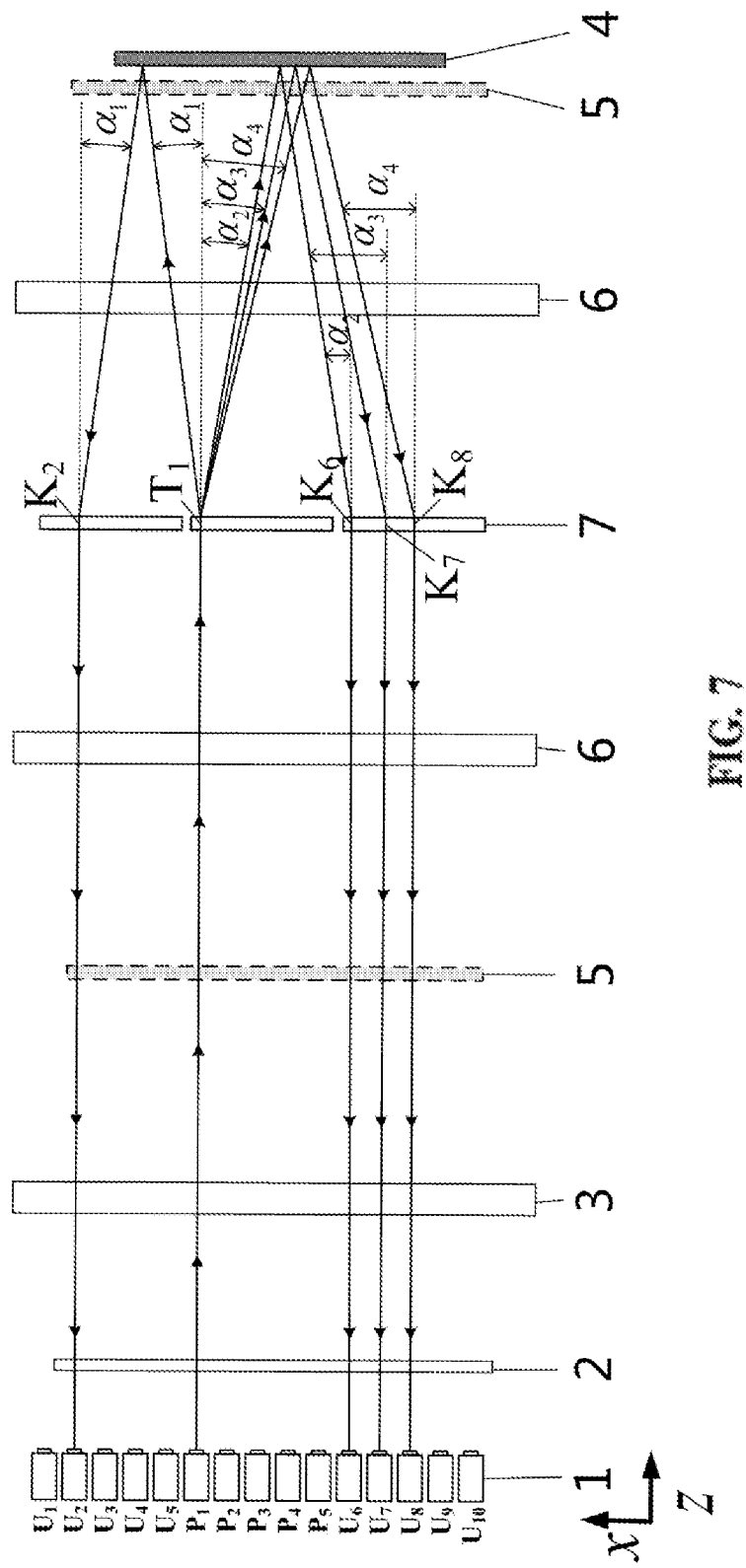
FIG. 7 is a schematic diagram of port witching on the xz plane in an example of a folding M×N WSS according to the present disclosure, to clearly represent an optical signal transmission path, the reflective liquid crystal spatial light modulator is represented as the transmission type, each beam only uses an optical axis to represent a transmission path, and the incident angle and diffraction angle of the transmission phase diffraction grating are omitted.
Figure 8:
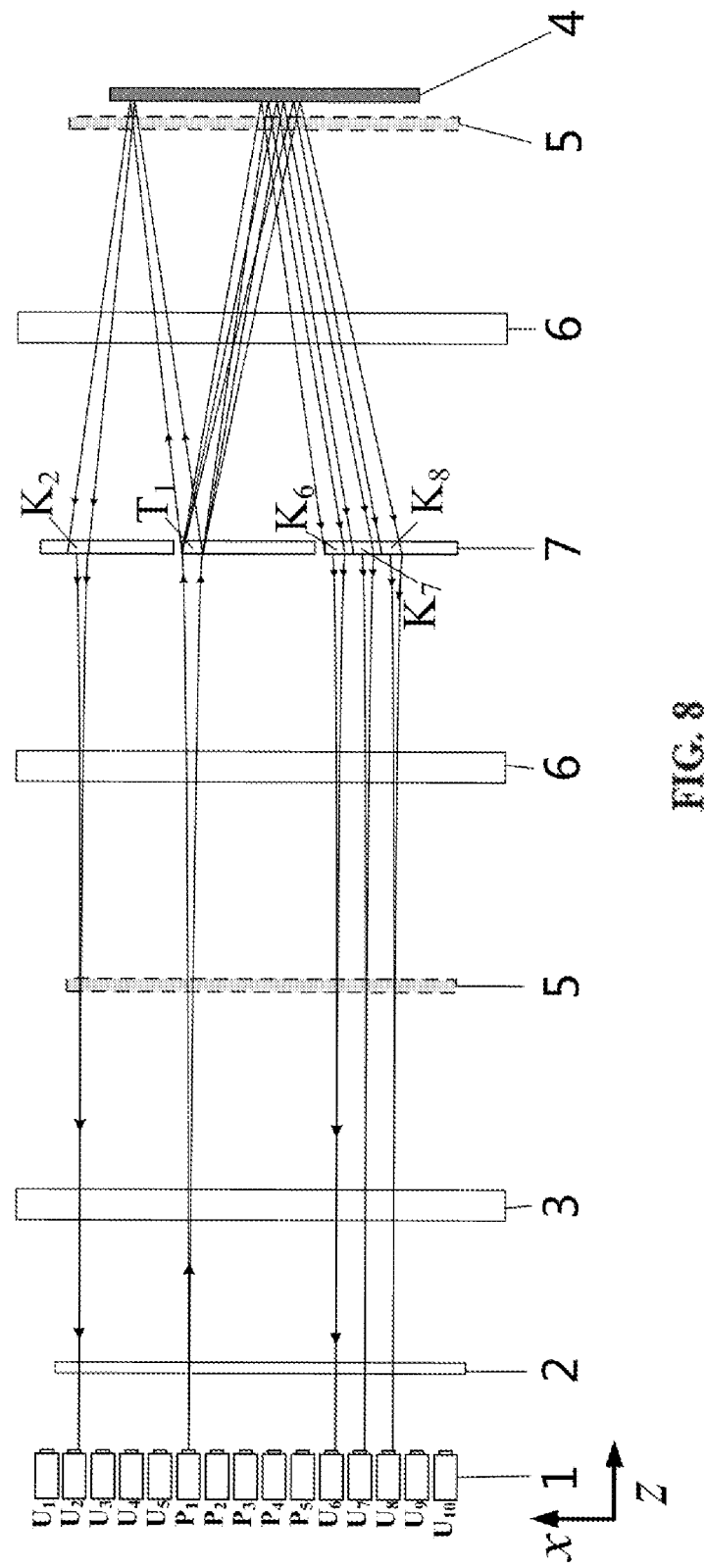
FIG. 8 is a schematic diagram of size conversion of beams on the xz plane in an example of a folding M×N WSS according to the present disclosure, to clearly represent an optical signal transmission path and a corresponding size change, the reflective liquid crystal spatial light modulator is represented as the transmissive type, and the incident angle and diffraction angle of the transmission phase diffraction grating are omitted.

(8) The beams with different wavelengths in the incident beam return, after the first deflection, to the other side of the second long-focus cylindrical mirror 6, which is symmetrical to the incident beam along the generatrix. The transverse deflection angles $\theta$ between the reflected beams and the xz plane disappear after the reflected beams passes through the second long-focus cylindrical mirror 6. The second long-focus cylindrical mirror 6 converges light with different wavelengths in the beam to the second transmission region $S_2$ of the transmission phase diffraction grating 5 to implement a first inverse dispersion in the second transmission region $S_2$ of the transmission phase diffraction grating 5. Afterwards, the retroreflector 4 reflects the light. As shown in FIG. 7, because the retroreflector 4 is placed perpendicular to the yz plane, included angles between the beams reflected by the retroreflector 4 and the yz plane are equal to deflection angles between the wavelength beam after the first deflection and the yz plane.

(9) The beams reflected by the retroreflector 4 pass through the second transmission region $S_2$ of the transmission phase diffraction grating 5 again, to implement a second dispersion. The beams with the first to fourth wavelengths $\lambda_1$, $\lambda_2$, $\lambda_3$, and $\lambda_4$ are projected to a second, sixth, seventh and eighth regions $K_2$, $K_6$, $K_7$, and $K_8$ in the second reflection region of the liquid crystal spatial light modulator 7 after passing through the second long-focus cylindrical mirror 6. In this case, the second long-focus cylindrical mirror 6 enables the beams with different wavelengths to be transmitted in parallel to each other and to form the transverse deflection angles $\theta$ with the xz plane.

(10) The liquid crystal graphic loading control system 8 loads the specific phase grayscale images on the second, sixth, seventh and eighth regions $K_2$, $K_6$, $K_7$, and $K_8$ of the second reflection region of the liquid crystal spatial light modulator 7, to enable the reflected beams to form different included angles with the yz plane; and thus when the beams after the second dispersion return to the second reflection region of the liquid crystal spatial light modulator 7, controls the liquid crystal spatial light modulator 7 to load the specific phase grayscale image on a pixel region corresponding to a corresponding wavelength to implement a second deflection of the beams which enables the different included angles between the beams with the first to fourth wavelengths $\lambda_1$, $\lambda_2$, $\lambda_3$, and $\lambda_4$ and the yz plane to disappear, and enables optical axes of beams with one or more wavelengths after the second deflection to be parallel to optical axes of beams with same wavelengths before the first deflection, and light with a wavelength corresponding to a non-parallel beam is discarded. When wavelengths are the same, there is an offset in the x-axis direction between the beams after the second deflection and the beams before the first deflection. Therefore, the beams with the first to fourth wavelengths $\lambda_1$, $\lambda_2$, $\lambda_3$, and $\lambda_4$ after the second deflection in the second, sixth, seventh and eighth regions $K_2$, $K_6$, $K_7$, and $K_8$ of the second reflection region can return to corresponding second, sixth, seventh and eighth output ports $U_2$, $U_6$, $U_7$, and $U_8$.

(11) The liquid crystal spatial light modulator 7 converts a divergence state of the incident beam along the x-axis on the xz plane into a converging state along the x-axis when implementing the second deflection of the incident beam, to implement a second conversion of the beam. A location of an output port of the one-dimensional single-mode fiber optic collimator array is a converging focal plane. The two beam conversions of the liquid crystal spatial light modulator 7 are considered as the 4f optical system, and a plane in which the retroreflector 4 is located is a 2f location of the 4f optical system, where f is the focal length.

(12) The subsequently returned beams pass through the second long-focus cylindrical mirror 6 to the first transmission region of the transmission phase diffraction grating 5 for a second inverse dispersion. Then the beams after the second inverse dispersion return to any one or more specific ports corresponding to the N output ports after sequentially passing through the generatrices of the first long-focus cylindrical mirror 3 and the short-focus cylindrical mirror 2. Therefore, port switching of the optical signal in the incident beam with any wavelength channel and any bandwidth is implemented by the two deflections and reflections of the incident beam by using the retroreflector 4 and the liquid crystal spatial light modulator 7.

Finally, it should be noted that disclosure of the examples is intended to help further understand the present disclosure. Those skilled in the art can understand that various substitutions and modifications may be made without departing from the spirit and scope of the present disclosure and the appended claims. Therefore, the present disclosure should not be limited to the content disclosed in the examples, and the scope of protection claimed by the present disclosure is subject to the scope defined by the claims.

We claim:

1. A method for implementing a folding M×N wavelength selective switch (WSS), wherein the method comprises:
   (1) constructing an optical path, wherein:
   (a) a one-dimensional single-mode fiber optic collimator array, a short-focus cylindrical mirror, a first long-focus cylindrical mirror, a retroreflector, a transmission phase diffraction grating, a second long-focus cylindrical mirror, a liquid crystal spatial light modulator, and a liquid crystal graphic loading control system are provided successively along a beam transmission direction;
   (b) the one-dimensional single-mode fiber optic collimator array comprises M+N single-mode fiber optic collimators, all the single-mode fiber optic collimators are arranged into a one-dimensional array along an x-axis direction, the M single-mode fiber optic collimators are used as input ports, the N single-mode fiber optic collimators are used as output ports, and beam transmission directions of each input port and each output port are along a z-axis direction;

(c) generatrices of the short-focus cylindrical mirror and the first long-focus cylindrical mirror are located on an xz plane, a z-axis passes through the generatrices of the short-focus cylindrical mirror and the first long-focus cylindrical mirror respectively, and the short-focus cylindrical mirror and the first long-focus cylindrical mirror form a 4f optical system;

(d) a surface of the transmission phase diffraction grating is evenly divided along a center line thereof into a first transmission region and a second transmission region that are the same and symmetrical with each other, the center line of the transmission phase diffraction grating is along the x-axis direction, a center line of the first transmission region is centrally aligned with a generatrix of the first long-focus cylindrical mirror, and the center line of the first transmission region is along the x-axis direction;

(e) the center line of the surface of the transmission phase diffraction grating is centrally aligned with a generatrix of the second long-focus cylindrical mirror and a center line of a surface of the liquid crystal spatial light modulator;

(f) planes of liquid crystal chips of the liquid crystal spatial light modulator and the retroreflector are placed perpendicular to a yz plane, the retroreflector is placed in front of the second transmission region of the transmission phase diffraction grating, a center line of the retroreflector is along the x-axis direction, and the center line of the retroreflector is centrally aligned with a center line of the second transmission region; and (g) the liquid crystal chips of the liquid crystal spatial light modulator are divided into M+N regions, wherein the M regions that are respectively in a one-to-one correspondence with the M input ports are used as a first reflection region, the N regions that are respectively in a one-to-one correspondence with the N output ports are used as a second reflection region, both M and N are natural numbers greater than or equal to 2, and the liquid crystal spatial light modulator is connected to the liquid crystal graphic loading control system;

(2) inputting M inter-independent incident beams with consecutive wavelengths respectively to the M input ports in the one-dimensional single-mode fiber optic collimator array;

(3) outputting, by the M input ports, M Gaussian beams transmitted inter-independently in parallel to each other along the z-axis, wherein optical axes of the M Gaussian beams pass through the generatrix of the short-focus cylindrical mirror and the generatrix of the first long-focus cylindrical mirror, M outgoing beams are expanded and collimated along a y-axis direction into M parallel beams along the y-axis direction by adjusting focal lengths of the short-focus cylindrical mirror and the first long-focus cylindrical mirror, and the short-focus cylindrical mirror and the first long-focus cylindrical mirror increase sizes of the M beams in the y-axis direction, and do no adjust sizes of the M beams in the x-axis direction;

(4) reaching, by the M beams, the first transmission region of the transmission phase diffraction grating, the M beams shown as elliptical spots with the y-axis as a long axis in the first transmission region of the transmission phase diffraction grating; and performing, by the transmission phase diffraction grating, a first dispersion on incident beams, such that beams with different wavelengths have different diffraction angles when respective beams pass through the transmission phase diffraction grating, the beams with different wavelengths are spatially separated, and various beams with different wavelengths comprised in the M beams are dispersed to a side of the second long-focus cylindrical mirror at different angles along an xz plane of respective propagation directions;

(5) converting, by the second long-focus cylindrical mirror, the dispersed beams with different wavelengths in different diffraction angles into the beams transmitted with optical axes in parallel to each other; focusing a single-wavelength beam into the liquid crystal spatial light modulator; integrally deflecting these beams transmitted in parallel to each other towards a center line of the liquid crystal spatial light modulator; further compressing, by the second long-focus cylindrical mirror, an elliptical beam with a single wavelength in the beams and with the y-axis as a long axis before into an elliptical beam with the x-axis as a long axis; and projecting the M beams to corresponding M regions in the first reflection region on the liquid crystal chips;

(6) transmitting the beams with different wavelengths in parallel to each other, and projecting the beams to respectively corresponding different pixel regions in the first reflection region of the liquid crystal spatial light modulator, wherein included angles between the beams with different wavelengths in M incident beams and the xz plane are transverse deflection angles θ; loading, by the liquid crystal graphic loading control system, specific phase grayscale images in pixel regions corresponding to different wavelengths in the M regions of the first reflection region of the liquid crystal spatial light modulator, such that light reflected in a corresponding pixel region passes through the second long-focus cylindrical mirror and the transmission phase diffraction grating to the retroreflector to be reflected and then return to one of the N regions of the second reflection region, wherein the one of the N regions corresponds to one of the N output ports; and loading, by the liquid crystal graphic loading control system, different phase grayscale images to control the reflected light to form different included angles with the yz plane for implementing a first deflection of the incident beams, wherein included angles between all reflected light with different wavelengths and the xz plane remain equal to the transverse deflection angles θ;

(7) converting, by the liquid crystal spatial light modulator, a divergence state of the incident beams along the x-axis on the xz plane into a converging state along the x-axis during the first deflection of the incident beams, to implement a first conversion of the beams, wherein a location of the retroreflector is a converging focal plane, and the beams continue to diverge along the x-axis after converging along the x-axis at the location of the retroreflector;

(8) returning, by the beams with different wavelengths in the M incident beams after the first deflection, to another side of the second long-focus cylindrical mirror, which is symmetrical to the incident beams along the generatrix, wherein the transverse deflection angles θ between the reflected beams and the xz plane disappear after the reflected beams passes through the second long-focus cylindrical mirror; converging, by the second long-focus cylindrical mirror, light with different wavelengths in the same beam of the beams to the second transmission region of the transmission phase diffraction grating to implement a first inverse dispersion in the second transmission region of the transmission phase diffraction grating; and then reflecting, by the retroreflector, the light, wherein since the retroreflector is placed perpendicular to the yz plane, included angles between the beams reflected by the retroreflector and the yz plane are equal to deflection angles between the wavelength beams after the first deflection and the yz plane;

(9) passing, by the beams reflected by the retroreflector, through the second transmission region of the transmission phase diffraction grating again to implement a second dispersion; and projecting the beams after the second dispersion to the corresponding N regions in the second reflection region of the liquid crystal spatial light modulator after passing through the second long-focus cylindrical mirror, wherein in this case, the second long-focus cylindrical mirror enables the beams with different wavelengths to be transmitted in parallel to each other and to form the transverse deflection angles θ with the xz plane;

(10) loading, by the liquid crystal graphic loading control system, the specific phase grayscale images on the N regions of the second reflection region of the liquid crystal spatial light modulator to enable the reflected beams to form different included angles with the yz plane; when the beams after the second dispersion return to the second reflection region of the liquid crystal spatial light modulator, controlling the liquid crystal spatial light modulator to load the specific phase grayscale images on pixel regions corresponding to a corresponding wavelength to implement a second deflection of the beams, wherein the second deflection enables the different included angles between the different beams and the yz plane to disappear, and enables optical axes of beams with one or more wavelengths after the second deflection to be parallel to optical axes of beams with same wavelengths before the first deflection, and light with a wavelength corresponding to a non-parallel beam is discarded; and when wavelengths are the same, generating an offset in the x-axis direction between the beams after the second deflection and the beams before the first deflection, so that the N beams after the second deflection in the N regions of the second reflection region can return to corresponding output ports;

(11) converting, by the liquid crystal spatial light modulator, a divergence state of the incident beams along the x-axis on the xz plane into a converging state along the x-axis during the second deflection of the incident beams, to implement a second conversion of the beams, wherein a location of an output port of the one-dimensional single-mode fiber optic collimator array is a converging focal plane, the first and second beam conversions of the liquid crystal spatial light modulator are considered as the 4f optical system, and a plane in which the retroreflector is located is a 2f location of the 4f optical system; and

(12) transmitting, for a second inverse dispersion, subsequently returned beams to the first transmission region of the transmission phase diffraction grating after passing through the second long-focus cylindrical mirror, and the beams after the second inverse dispersion returning to any one or more of specific ports corresponding to the N output ports after sequentially passing through the generatrices of the first long-focus cylindrical mirror and the short-focus cylindrical mirror, so that port switching of optical signal in the incident beams with any wavelength channel and any bandwidth is implemented by the first and second deflections and reflections of the incident beams by using the retroreflector and the liquid crystal spatial light modulator.

2. The method according to claim 1, wherein the liquid crystal spatial light modulator comprises multiple liquid crystal chips, a quantity of liquid crystal chips is expanded based on a quantity of required ports, and a surface of each liquid crystal chip is a two-dimensional pixel array; and the liquid crystal graphic loading control system loads the specific phase grayscale images on the two-dimensional pixel array, to produce a diffraction effect on a beam incident on a corresponding pixel, such that an specific angle deflection of incident light is implemented by loading the specific phase grayscale images.

3. The method according to claim 1, wherein the short-focus cylindrical mirror is a cylindrical mirror with a focal length within 100 mm.

4. The method according to claim 1, wherein the first long-focus cylindrical mirror and the second long-focus cylindrical mirror are cylindrical mirrors with focal lengths greater than 50 mm.

5. The method according to claim 1, wherein N is an even number, N/2 output ports are located above the M input ports along the x-axis direction, other N/2 output ports are located below the M input ports, and the output ports are distributed symmetrically with each other with respect to the yz plane.

* * * * *